Aug. 25, 1942.  W. C. SCHULFER, JR  2,294,321
WELDING ELECTRODE HOLDER
Filed July 25, 1941
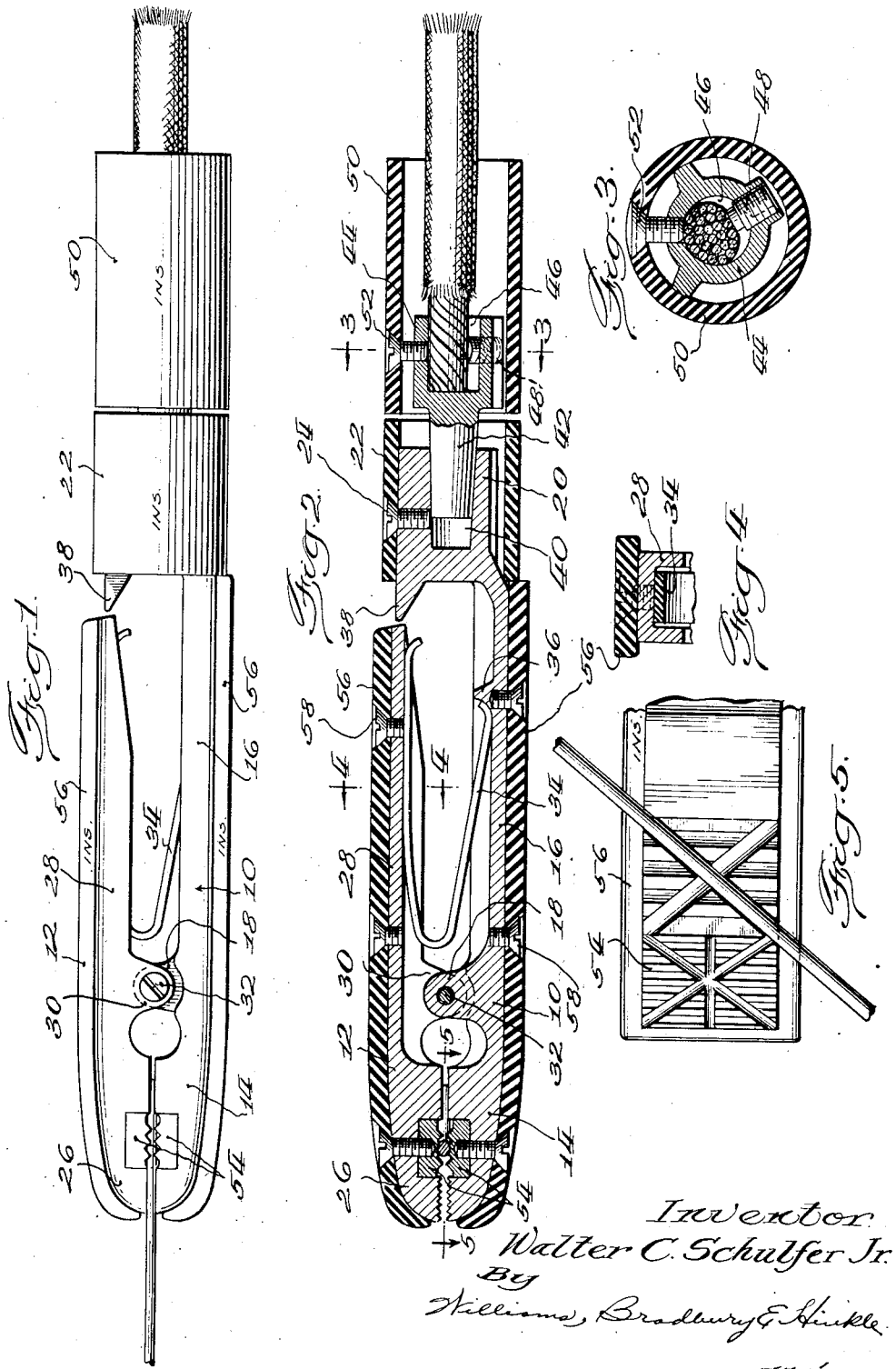
Inventor
Walter C. Schulfer Jr.
By
Williams, Bradbury & Hinkle
Attys.

Patented Aug. 25, 1942

2,294,321

UNITED STATES PATENT OFFICE 2,294,321

WELDING ELECTRODE HOLDER

Walter C. Schulfer, Jr., Summit, Ill.

Application July 25, 1941, Serial No. 403,939

2 Claims. (Cl. 219—8)

The present invention relates to welding electrode holders of the type used by electric welders both as a handle by which the welding rod or electrode is held and also as a means for connecting the welding cable to the welding rod.

It is the principal object of the present invention to provide an improved welding electrode holder which is comparatively simple in construction and light in weight and avoids the bulkiness usually associated with devices of this type.

It is a further object of the present invention to provide a novel electrode holder with means by which a welding cable may be quickly attached to any one of several electrode holders.

Still another object of the present invention is to provide an electrode holder with simple and novel means for preventing accidental burning of the work upon which a welding operation is being conducted.

Yet another object of the present invention is to provide an improved electrode holder having novel means for quickly detaching an electrode gripping portion of the holder from the welding cable when desired as for instance, when it is wished to change electrodes.

Still another object is to provide an improved electrode holder which effectively reduces the danger of injury to the welder.

In the drawing in which similar characters of reference refer to similar parts throughout the several views:

Fig. 1 is a side elevation of an electrode holder embodying the present invention;

Fig. 2 is a vertical longitudinal sectional view through the holder shown in elevation in Fig. 1;

Fig. 3 is a transverse sectional view which may be considered as taken in the direction of the arrows substantially along the line 3—3 of Fig. 2;

Fig. 4 is a transverse sectional view through a portion of the device and may be considered as taken in the direction of the arrows along the line 4—4 of Fig. 2; and Fig. 5 is a plan view of one of the electrode holding jaws. This view may be considered as taken along the line 5—5 of Fig. 2 looking downwardly, as indicated by the arrows.

Referring to the drawing, it will be seen that the electrode holder there shown is comprised principally of a lower clamping member 10 and an upper clamping member 12. Both of these members may be formed as castings of red brass. The lower of these members 10 forms the largest single structural element of the device and includes a forwardly extending jaw 14 formed integrally with a rearwardly extending channel-shaped arm portion 16. Between these two portions, an integrally formed upwardly extending ear 18 serves as one element of a hinge for pivotally connecting the lower member 10 to the upper member 12 in a manner to be described presently. At its rearward end the channel-shaped arm 16 is formed integrally with a rearwardly extending spider portion 20 which fits within and is entirely covered by an insulating sleeve 22 formed of hard fiber or other suitable material. This hard fiber sleeve 22 extends somewhat rearwardly of the portion 20 and is secured thereto by a screw 24 which extends through the sleeve 22 and into the portion 20 and has its head countersunk below the outer surface of the sleeve.

The upper member 12 is generally similar to the lower member 10 and has a jaw 26 formed integrally with a rearwardly extending channel-shaped arm 28 which, at its rearward end, stops short by a matter of a half inch or so of the forward end of the rearwardly extending portion 20 formed with the lower member 16. Instead of having a single centrally located ear 18, as does the lower member, the upper member is provided with a pair of ears 30, which extend downwardly upon each side of the central ear 18 and are pivoted thereto by means of a transversely extending screw 32. Thus, by depressing the arm 28 of the upper element 12 relative to the lower arm 16, the jaws 26 and 14 are separated, while when the arms 16 and 28 are separated the jaws 14 and 26 are brought together.

A single U-shaped leaf spring 34 is flexed and inserted between the rearwardly extending arms 16 and 28. It thus urges these arms apart and thereby causes the jaws 14 and 26 to approach each other. This leaf spring 34 fits within the channels in the contiguous faces of the arms 16 and 28 and thus is limited in its side to side movement. It is limited in its forward movement by the ear 18 formed upon the lower member 16, and it cannot move rearwardly, since the lower channel of the strip 16 is provided with a stop 36 formed during the casting process. Once in place, therefore, the spring will not accidentally become disassociated with the other elements of the apparatus.

The two principal members of the device, that is, the lower member 10 and the upper member 12 are so proportioned that when the jaws 14 and 26 are spaced apart the required distance to hold a comparatively small welding rod, the rearwardly extending arms 16 and 28 will be substantially parallel. With the device as thus proportioned, it will be seen that the total dimension from top to bottom need not be great. When larger welding rods are used, the jaws 26 and 14 will, of course, be spaced a greater distance. Under these conditions, the rearwardly extending arms 16 and 28 will be closer together than in the first example. In order to permit a spacing apart of the jaws, an amount greater than that required for a rod of minimum size without appreciably increasing the top to bottom dimension of the device, the outer surfaces of the jaws 14 and 26 taper toward the end so that as the jaws are spaced apart, the outer surfaces of these noses tend toward parallelism. Thus the jaws may be spaced apart a distance sufficient to permit the admission of welding rods of several sizes without appreciably affecting the overall top to bottom dimension of the electrode holder.

The rearward portion 20 of the device to which the insulating sleeve 22 is secured, is offset upwardly toward the upper arm 28 so that the sleeve 22 is brought into substantial alignment with the forward portion of the device, while the upper forward portion of the rearwardly extending member 20 is providing with a forwardly extending finger 38 which substantially closes the distance between the rearward end of the upper arm 28 and the handle attachment member 20, thus effectively preventing the welder's fingers or a portion of the welder's clothing from becoming caught under the rearward end of the upper arm 28.

The rearward portion 20 is provided with a conical socket 40 extending thereinto and into which is fitted a conical plug 42 of an electrical cable connector. The conical plug of the connector, at its rearward end, carries a spider-like structure 44, which, in turn, is provided with a comparatively deep generally cylindrical recess 46. The uninsulated end of the welding cable is inserted into this recess 46, the cable being securely pressed into contact with the side walls thereof by means of a set screw 48. If desired the cable connector may be dispensed with and the end of the cable inserted directly into socket 40 and secured there by solder or other appropriate means. A second cylindrical sleeve of hard fiber or other insulating material 50 surrounds the welding cable terminal thus provided and is secured thereto by means of a flat head countersunk screw 52.

In assembling this portion of the apparatus, the cable is first inserted into the recess 46 and the set screw 48 tightened to secure the end of the cable therein. Then with the cable attached to the terminal, the terminal is slid endwise into the sleeve 50 and secured in place by means of the screw 52. The sleeve 50, therefore, serves as a handle by means of which the terminal 44 can be handled and the conical plug 42 wrung into place within the socket 40. With the plug thus fitted into the socket, the sleeve 50 serves as a continuation of the handle 22.

The jaws 14 and 26 are equipped with removable blocks 54 which are serrated to grip the welding electrode in any one of several positions and are secured in place in recesses in the jaws by means of screws extending inwardly through the jaws. A pair of flat strips 56 of hard fiber or other insulating material, somewhat wider than the jaws and rearwardly extending arms 16 and 28 are secured in face to face contact with the upper faces of the jaws 14 and 26 and extend rearwardly over the arms 16 and 28. These strips are attached to the castings by means of flat head countersunk screws 58, all of which extend through the strips and are threaded into the castings, excepting the forwardmost of these screws. The latter extend through the jaws 14 and 26 and are threaded into the removable blocks 54. They, therefore, serve the dual purpose of securing both the strips and the blocks 54 to the castings.

The strips 56 are generally rectangular in cross section and extend outwardly at each side somewhat beyond the edges of the metal portion of the device and effectively prevent the work becoming accidentally burned by careless manipulation of the electrode holder. That is, if the device when in the position shown in Fig. 1, for instance, is brought either upwardly or downwardly against the work being welded, these strips prevent contact between the work and the metallic portions of the device. Similarly, movement of the device in a sidewise direction against the work will cause the work to be impinged by the edges of the insulating strips 56 before the work comes into contact with the metallic parts. Thus by the expedient of attaching insulating strips wider than the metal parts to the extreme top and bottom surfaces of the device, adequate protection against work damages under normal circumstances is provided without the use of complicated insulating material shapes or other parts necessitating expensive manufacturing processes.

Preferably the jaw members 10 and 12 are coated—as by spraying—with a suitable electrical insulating and molten metal non-adherent varnish, the latter property eliminating or lessening the metal being welded from adhering to the jaws of the tool during the "splash" incident to the welding operation.

From the above, it will be seen that I have provided a welding electrode holder which adequately serves the purpose for which it is intended and which carries out all of the objectives set forth for it at an earlier portion of this specification. It will be observed that the holder as a whole is "streamlined" in that it has no laterally projecting parts that might interfere with the operator grasping the tool in any region he may desire, or that might catch upon gloves or other articles of clothing.

Having described my invention, what I claim as new and useful and desire to secure by Letters Patent of the United States is:

1. In a welding electrode holder, a pair of jaws for clamping an electrode, arms extending rearwardly from said jaws, hinge means connecting said arms at a point adjacent said jaws, said arms being substantially parallel when said jaws are closed and one of said arms being materially longer than the other, the longer of said arms having a portion offset into substantial alignment with, and closely adjacent to, the rearward end of the shorter of said arms when said jaws are closed, and the handle surrounding the rearward end of the longer of said arms including said offset portion, whereby said holder is substantially smooth in configuration on both sides and is symmetrical in formation without projecting elements.

2. In a welding electrode holder, a pair of jaws for clamping an electrode, arms extending rearwardly from said jaws, hinge means connecting said arms at a point adjacent said jaws, said arms having grooves in their adjacent faces rearwardly of said hinge means, a leaf spring arranged with its arms in said grooves, said arms being substantially parallel when said jaws are closed and one of said arms being materially longer than the other, the longer of said arms having its rearward portion offset into substantial alignment with, and closely adjacent to, the rearward end of the shorter of said arms when said jaws are closed, so as to provide a substantially uninterrupted surface extending rearwardly from the outer surface of the shorter of said arms, and a handle surrounding the rearward end of the longer of said arms including said offset portion, whereby said holder is substantially smooth in configuration on both sides and is symmetrical in formation without projecting elements which might cause interference when the device is in use.

WALTER C. SCHULFER, Jr.